United States Patent
Arslan et al.

(10) Patent No.: US 12,548,289 B2
(45) Date of Patent: *Feb. 10, 2026

(54) INFORMATION PROCESSING APPARATUS, INFORMATION PROCESSING METHOD, AND NON-TRANSITORY COMPUTER READABLE MEDIUM

(71) Applicant: Rakuten Group, Inc., Tokyo (JP)

(72) Inventors: Hasan Arslan, Tokyo (JP); Josue Cuevas Juarez, Tokyo (JP); Rajasekhar Sanagavarapu, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 587 days.

This patent is subject to a terminal disclaimer.

(21) Appl. No.: 17/915,857

(22) PCT Filed: Oct. 8, 2021

(86) PCT No.: PCT/JP2021/037384
§ 371 (c)(1),
(2) Date: Apr. 13, 2023

(87) PCT Pub. No.: WO2023/058233
PCT Pub. Date: Apr. 13, 2023

(65) Prior Publication Data
US 2024/0212311 A1    Jun. 27, 2024

(51) Int. Cl.
*G06V 10/56*    (2022.01)
*G06F 16/56*    (2019.01)
(Continued)

(52) U.S. Cl.
CPC ............. *G06V 10/56* (2022.01); *G06F 16/56* (2019.01); *G06F 16/5838* (2019.01); *G06T 7/90* (2017.01);
(Continued)

(58) Field of Classification Search
CPC .... G06F 18/22; G06F 16/5838; G06F 16/532; G06T 2210/16; G06T 2207/10024; G06V 10/56; G06V 10/761
See application file for complete search history.

(56) References Cited

U.S. PATENT DOCUMENTS

| | | | |
|---|---|---|---|
| 2011/0047155 A1* | 2/2011 | Sohn | H04N 19/134 707/E17.014 |
| 2021/0142097 A1* | 5/2021 | Zheng | G06V 10/761 |
| 2021/0256258 A1 | 8/2021 | Yeo | |

FOREIGN PATENT DOCUMENTS

JP    2009-251850 A    10/2009

OTHER PUBLICATIONS

Redmon, Joseph, et al. "You only look once: Unified, real-time object detection." Proceedings of the IEEE conference on computer vision and pattern recognition. 2016. (Year: 2016).*

(Continued)

*Primary Examiner* — Raphael Schwartz
(74) *Attorney, Agent, or Firm* — Sughrue Mion, PLLC

(57) ABSTRACT

An information processing apparatus (1) includes: an acquisition unit (101) configured to acquire an object image that contains one or more objects; a first inference unit (105) configured to infer one or more rectangular areas that respectively surround the one or more objects in the object image, and a type of each of the one or more objects, by applying the object image to a first learning model; a second inference unit (105) configured to infer an area of a target object in the object image by applying the one or more rectangular areas and the type of each of the one or more rectangular areas to a second learning model; and an extraction unit (105) configured to perform color determination on each pixel in the area of the target object and extract colors of the target object.

10 Claims, 16 Drawing Sheets

(51) Int. Cl.
*G06F 16/583* (2019.01)
*G06T 7/90* (2017.01)
*G06V 10/764* (2022.01)
*G06V 10/77* (2022.01)
*G06V 10/82* (2022.01)

(52) U.S. Cl.
CPC ........ *G06V 10/764* (2022.01); *G06V 10/7715* (2022.01); *G06V 10/82* (2022.01); *G06T 2207/10024* (2013.01); *G06T 2207/20052* (2013.01); *G06T 2207/20081* (2013.01); *G06T 2207/20084* (2013.01)

(56) References Cited

OTHER PUBLICATIONS

Manuel Diaz-Zapata et al., "YOLO-based Panoptic Segmentation Network", 2021 IEEE 45th Annual Computers, Software, and Applications Conference (COMPSAC), 2021, pp. 1230-1234 (5 total pages).

\* cited by examiner

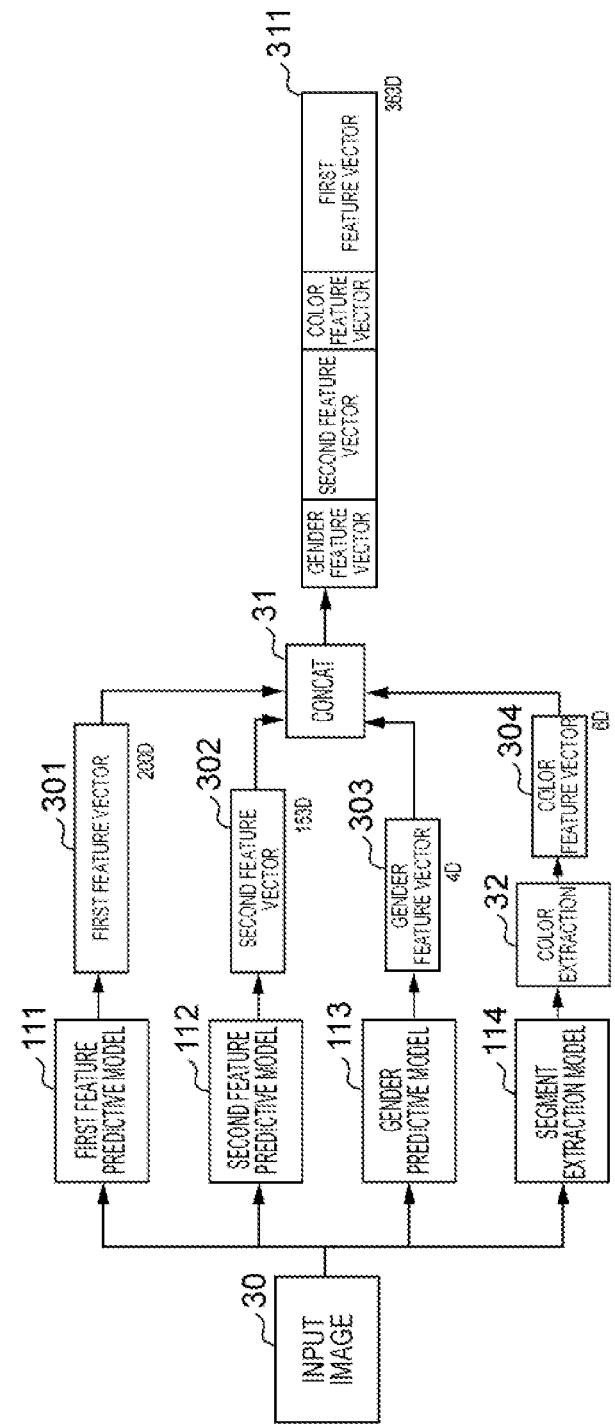

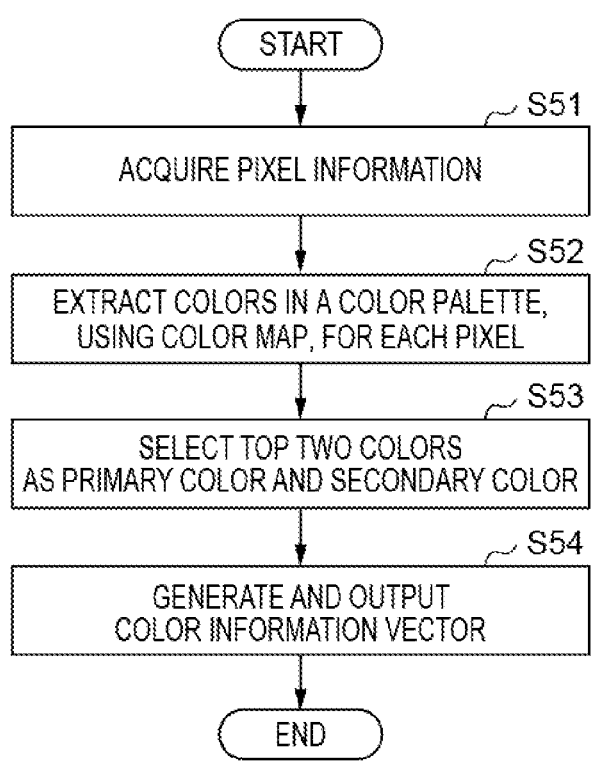

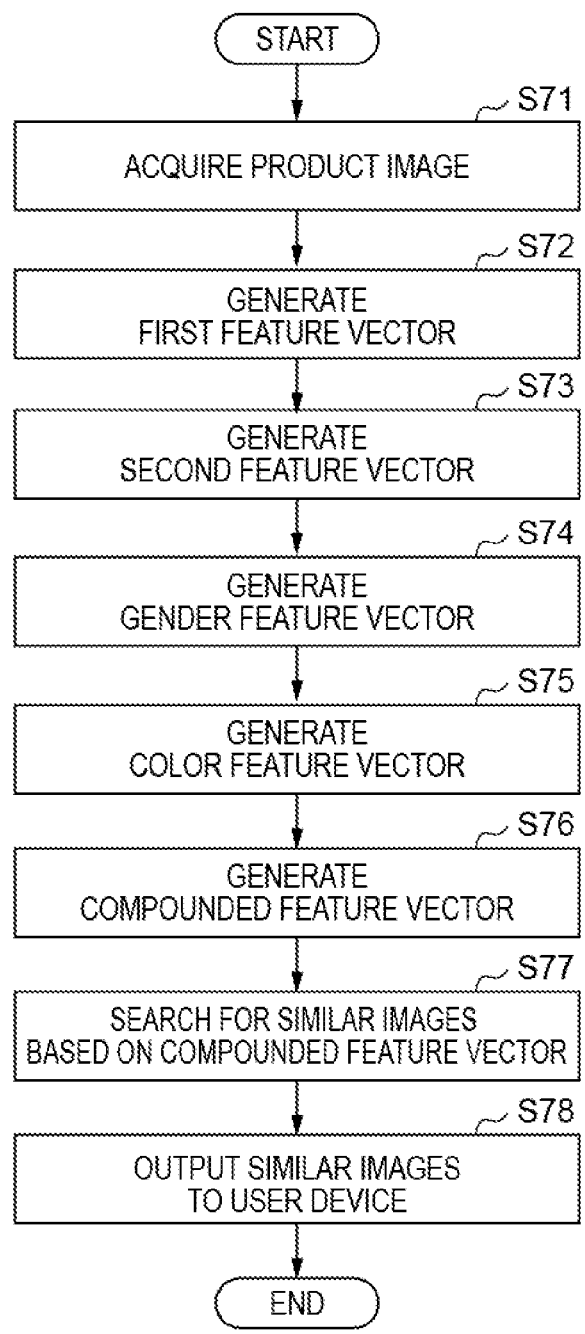

INFORMATION PROCESSING APPARATUS, INFORMATION PROCESSING METHOD, AND NON-TRANSITORY COMPUTER READABLE MEDIUM

CROSS REFERENCE TO RELATED APPLICATIONS

This application is a National Stage of International Application No. PCT/JP2021/037384 filed Oct. 8, 2021.

TECHNICAL FIELD

The present invention relates to an information processing apparatus, an information processing method, an information processing system, and a program, and particularly to a technique for extracting colors from an image with high accuracy.

BACKGROUND ART

In recent years, electronic commerce (E-commerce), through which products are sold using the Internet, has been actively carried out, and many EC (Electronic Commerce) sites have been built on the web to carry out such electronic commerce. EC sites are often built using the languages of countries around the world so that users (consumers) in many countries can purchase products. By accessing EC sites from a personal computer (PC) or a mobile terminal such as a smartphone, users can select and purchase desired products without visiting actual stores, regardless of the time of day.

There is a known function to search for, and present, one or more similar images based on an image of the product specified by the user (a product image), including an image of a product similar to the specified product, for the purpose of increasing the user's willingness to purchase products.

For example, Patent Literature Document 1 discloses a technique for deleting a background image from a product image to extract a product area, and searching for an image that includes an area similar to the product area.

Such a function can also be used to search for similar products in response to a user's request at a store that sells products dealt with on an EC site, using a terminal (a store terminal) provided at the store.

LISTING OF REFERENCES

Patent Literature Documents

Patent Literature Document 1: JP 2009-251850A

SUMMARY OF THE INVENTION

Problems to be Solved by the Invention

According to the technique disclosed in Patent Literature Document 1, similar images are searched for based on a product area extracted from a product image, and at this time, the color of the product area is also taken into consideration when the search is carried out. To extract the color of a product from a product image, it is first necessary to accurately extract the area of the product. However, according to the technique disclosed in Patent Literature Document 1, the foreground image and the background image of an image are simply separated from each other. Therefore, there is the possibility of the areas of the products subjected to the similarity search being not accurately extracted, and the extracted colors not properly representing the colors of the products.

The present invention is made in view of the above problems, and an objective thereof is to provide a technique for extracting a color that is to be used for a search, from an input image, with high accuracy.

Solution to the Problems

To solve the above-described problem, one aspect of an information processing apparatus according to the present invention includes: an acquisition unit configured to acquire an object image that contains one or more objects; a first inference unit configured to infer one or more rectangular areas that respectively surround the one or more objects in the object image, and a type of each of the one or more objects, by applying the object image to a first learning model; a second inference unit configured to infer an area of a target object in the object image by applying the one or more rectangular areas and the type of each of the one or more rectangular areas to a second learning model; and an extraction unit configured to perform color determination on each pixel in the area of the target object and extract colors of the target object.

In the information processing apparatus, the extraction unit may perform color determination on each pixel in the area of the target object, and extract a predetermined number of top colors from among one or more colors determined in the area of the target object, as the colors of the target object.

In the information processing apparatus, the first learning model may be a YOLO (You Only Look Once) learning model.

In the information processing apparatus, the second learning model may be a learning model constituted by an FCN (Fully Convolutional Network).

In the information processing apparatus, the object image may be image data generated from a Y element, a Cb element, and a Cr element of data generated from a YCbCr image through a DCT conversion.

The image data may be data generated by adjusting sizes of Y elements, Cb elements, and Cr elements of pieces of data subjected to DCT conversion, and concatenating the pieces of data with each other.

The information processing apparatus may further include: a generation unit configured to generate a plurality of feature vectors for the target object by applying a color feature vector indicating the colors of the target object extracted by the extraction unit, and the object image, to a plurality of learning models; a concatenation unit configured to concatenate and embed the color feature vector and the plurality of feature vectors into a common feature space to generate a compounded feature vector in the feature space; and a search unit configured to search for similar images that are similar to the object image of the target object, using the compounded feature vector.

To solve the above-described problem, one aspect of an information processing method according to the present invention includes: acquiring an object image that contains one or more objects; inferring one or more rectangular areas that respectively surround the one or more objects in the object image, and a type of each of the one or more objects, by applying the object image to a first learning model; inferring an area of a target object in the object image by applying the one or more rectangular areas and the type of each of the one or more objects to a second learning model;

and performing color determination on each pixel in the area of the target object and extracting colors of the target object.

To solve the above-described problem, one aspect of an information processing program according to the present invention is an information processing program for enabling a computer to perform information processing, the program enabling the computer to perform: acquisition processing to acquire an object image that contains one or more objects; first inference processing to infer one or more rectangular areas that respectively surround the one or more objects in the object image, and a type of each of the one or more objects, by applying the object image to a first learning model; a second inference processing to infer an area of a target object in the object image by applying the one or more rectangular areas and the type of each of the one or more rectangular areas to a second learning model; and an extraction processing to perform color determination on each pixel in the area of the target object and extract colors of the target object.

To solve the above-described problem, one aspect of an information processing system according to the present invention is an information processing system including a user device and an information processing apparatus, the user device including a transmission unit configured to transmit an object image that contains one or more objects, to the information processing apparatus, and an acquisition unit configured to acquire the object image; a first inference unit configured to infer one or more rectangular areas that respectively surround the one or more objects in the object image, and a type of each of the one or more objects, by applying the object image to a first learning model; a second inference unit configured to infer an area of a target object in the object image by applying the one or more rectangular areas and the type of each of the one or more rectangular areas to a second learning model; and an extraction unit configured to perform color determination on each pixel in the area of the target object and extract colors of the target object.

Advantageous Effects of the Invention

According to the present invention, it is possible to extract a color that is to be used for a search, from an input image, with high accuracy. In addition, by using information regarding the extracted color, it is possible to carry out a highly accurate similar image search, which improves usability.

A person skilled in the art will be able to understand the above-mentioned objective, aspects, and effects of the present invention and objectives, aspects, and effects of the present invention that are not mentioned above from the following embodiments for carrying out the invention by referencing the accompanying drawings and the recitations in the scope of claims.

BRIEF DESCRIPTION OF THE DRAWINGS

FIG. 3A is a conceptual diagram showing feature vectors and a compounded feature vector.

FIG. 5C shows a flow of color extraction processing.

FIG. 7 is a flowchart showing processing performed by the information processing apparatus according to an embodiment of the present invention.

DESCRIPTION OF EMBODIMENTS

Figure 1:
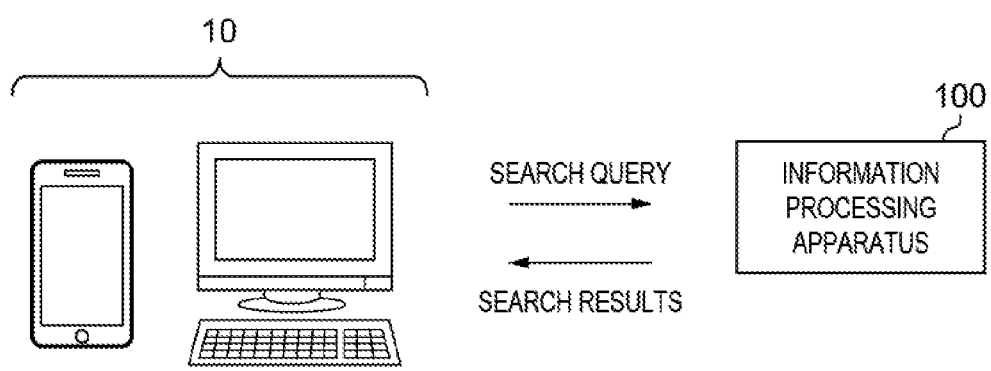
FIG. 1 shows an example of a configuration of an information processing system according to an embodiment of the present invention.

Hereinafter, embodiments for carrying out the present invention will be described in detail with reference to the accompanying drawings. Among the constituent elements disclosed below, those having the same function are designated by the same reference numerals, and the descriptions thereof will be omitted. Note that the embodiments disclosed below are examples of means for realizing the present invention, and should be modified or changed as appropriate depending on the configuration of the device to which the present invention is applied and on various conditions. The present invention is not limited to the embodiments below. In addition, not all the combinations of the features described in the embodiments are essential for the solutions according to the present invention.

First Embodiment

Configuration of Information Processing System

FIG. 1 shows a configuration of an information processing system according to the present embodiment. The information processing system includes a user device 10 such as a terminal device or a store terminal provided in a store, and an information processing apparatus 100.

The user device 10 is a device such as a smartphone or a tablet, and is configured to be able to communicate with the information processing apparatus 100 via a public network such as an LTE (Long Term Evolution) network or a wireless communication network such as a wireless LAN (Local Area Network). The user device 10 includes a display unit (a display surface) such as a liquid crystal display, and the user can perform various operations, using a GUI (Graphic User Interface) provided on the liquid crystal display. The operations include various operations on contents such as images displayed on the screen, e.g., a tap operation, a slide operation, and a scroll operation that are performed with a finger, a stylus, or the like.

The user device 10 may be a device such as a desktop PC (Personal Computer) or a laptop PC. In such a case, the user uses an input device such as a mouse or a keyboard to perform an operation. The user device 10 may be provided with a separate display surface.

The user device 10 transmits a search query to the information processing apparatus 100, following a user operation. A search query corresponds to a request that is associated with an image (a product image (an object image)) that includes a product (an object), and has been made to carry out a search for similar images that are similar to the product image (images that include a product that is similar to the product). In the following description, a product image subjected to a similar image search may also be referred to as a query image. For example, the user can send a search query by selecting one product image from one or more product images displayed on the display unit of the user device 10 as a query image, and thereafter selecting a predetermined search button. The search query can include (can be associated with) information regarding the query image in a format that can be decoded by the information processing apparatus 100 or a URL format.

The information processing apparatus 100 is a server device that can be used to build an EC site and distribute web contents. In the present embodiment, the information processing apparatus 100 is configured to be able to provide a search service. Through the search service, the information processing apparatus 100 can generate content (a search result) corresponding to a search query received from the user device 10, and distribute (output) the content to the user device 10.

Functional Configuration of Information Processing Apparatus 100

The information processing apparatus 100 according to the present embodiment acquires a product image associated with a search query received from the user device 10, generates a plurality of feature vectors with reference to a plurality of attributes of the product included in the product image, generates a compounded feature vector in which the plurality of feature vectors are concatenated with each other, and searches for similar images that are similar to the product image, using the compounded feature vector.

Figure 2:
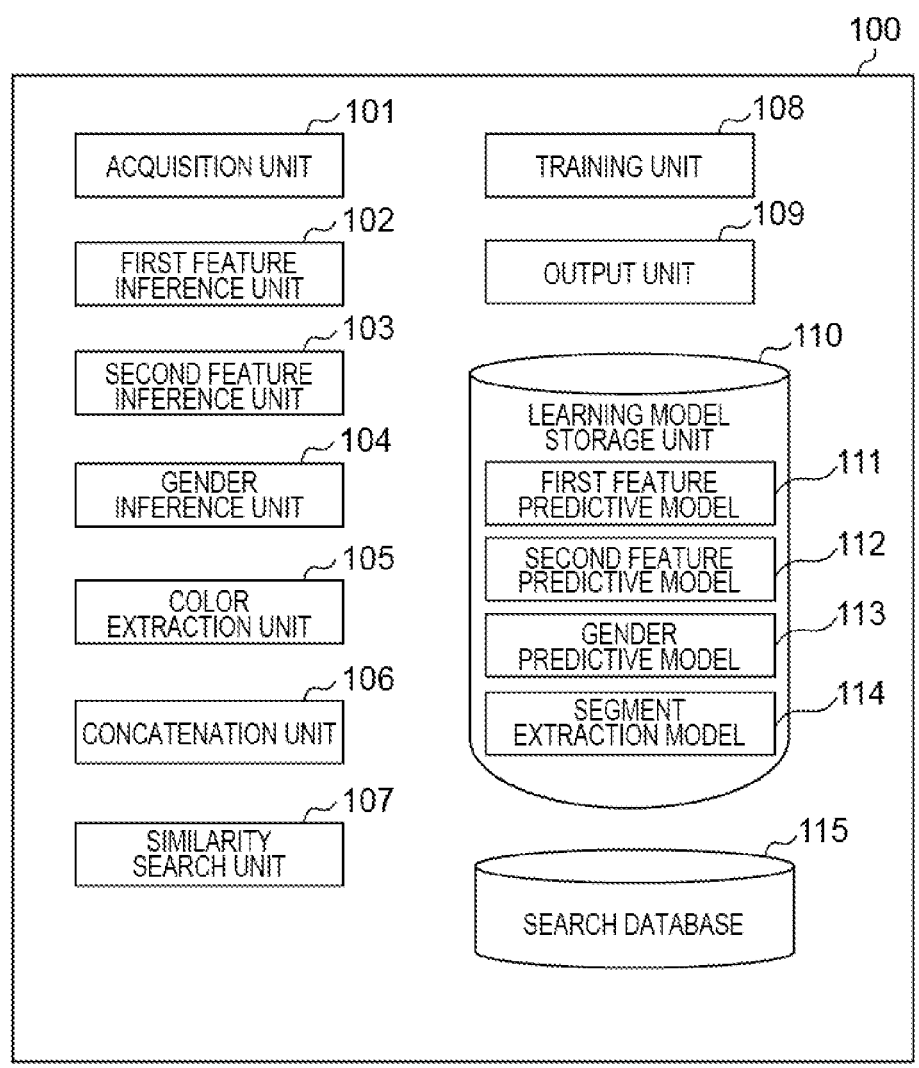
FIG. 2 is a block diagram showing an example of a functional configuration of an information processing apparatus according to an embodiment of the present invention.

FIG. 2 shows an example of a functional configuration of the information processing apparatus 1 according to the present embodiment.

The information processing apparatus 1 shown in FIG. 2 includes an acquisition unit 101, a first feature inference unit 102, a second feature inference unit 103, a gender inference unit 104, a color extraction unit 105, a concatenation unit 106, a similarity search unit 107, a training unit 108, an output unit 109, a learning model storage unit 110, and a search database 115. The learning model storage unit 110 stores various learning models (a first feature predictive model 111, a second feature predictive model 112, a gender predictive model 113, and a segment extraction model 114) that are to be used by the first feature inference unit 102, the second feature inference unit 103, the gender inference unit 104, and the color extraction unit 105. The various learning models will be described later. The search database 115 is a database that stores information related to similar image searches, and may be provided outside the information processing apparatus 100.

The acquisition unit 101 acquires a product image (a query image). In the present embodiment, the acquisition unit 101 receives a search query transmitted by the user device 10 and acquires a product image associated with (included in) the search query.

The product image may be an image expressed by three colors, namely red (R), green (G), and blue (B). Alternatively, the product image may be an image expressed by a luminance (Y (Luma)) representing brightness and color components (Cb and Cr (Chroma)) (an image generated from an RGB image (YCbCr image) through a YCbCr-conversion). Alternatively, the product image may be data (a coefficient) generated from a YCbCr image through a DCT (Discrete Cosine Transform) conversion (compression) performed by a coding unit (not shown) included in the information processing apparatus 100. It is also possible to employ a configuration in which the acquisition unit 101 acquires data, which is a product image, subjected to (a YCbCr conversion and) a DCT conversion performed by a device other than the information processing apparatus 100.

The acquisition unit 101 outputs the acquired product image to the first feature inference unit 102, the second feature inference unit 103, the gender inference unit 104, and the color extraction unit 105.

The first feature inference unit 102, the second feature inference unit 103, the gender inference unit 104, the color extraction unit 105, and the concatenation unit 106 will be described with reference to FIG. 3A as well. FIG. 3A is a conceptual diagram showing feature vectors and a compounded feature vector.

The first feature inference unit 102 applies the product image (corresponding to an input image 30 in FIG. 3A) acquired by the acquisition unit 101, to the first feature predictive model 111, and performs supervised learning to infer (predict) a first feature of the product and generate a first feature vector 301 that indicates the first feature. The first feature indicates an upper-level (generalized) classification of the product, and is also referred to as a category. Note that, in the present specification, a feature vector represents a value/information that represents a feature.

The second feature inference unit 103 applies the product image acquired by the acquisition unit 101, to the second feature predictive model 112, and performs supervised learning to infer (predict) a second feature of the product and generate a second feature vector 302 that indicates the second feature. The second feature indicates a lower-level (subdivided) classification of the product, and is associated with the first feature. The second feature is also referred to as a genre. Note that the second feature inference unit 103 may be configured to apply the product image to the first feature predictive model 111 to infer the first feature, and infer the second feature from the inferred first feature.

As described above, the first feature indicates an upper-level (generalized) product classification type, and the second feature indicates a lower-level (subdivided) product classification type.

Specific examples of the first feature (category) include product classification types such as men's fashion, ladies' fashion, fashion goods, innerwear, shoes, accessories, and watches.

When the first feature is ladies' fashion, examples of the second feature (genre) include product category types such as pants, a shirt, a blouse, a skirt, and a one-piece dress.

The first feature inference unit 103 and the second feature inference unit 104 respectively output the generated first feature vector 301 and second feature vector 302 to the concatenation unit 106.

The gender inference unit 104 applies the product image acquired by the acquisition unit 101 to the gender predictive model 113 and performs supervised learning to infer (predict) the gender targeted by the product and generate a gender feature vector 303 indicating the gender. In the present embodiment, the gender inference unit 104 can identify not only the gender such as male or female but also other classifications such as kid and unisex.

The gender inference unit 104 outputs the generated gender feature vector 303 to the concatenation unit 106.

The color extraction unit 105 applies the product image acquired by the acquisition unit 101 to the segment extraction model 114 and performs supervised learning to acquire a product area as a segment, extract colors of the segment (the segmented area) (corresponding to color extraction 32 in FIG. 3A), and generate a color feature vector 304 indicating the colors. The processing performed by the color extraction unit 105 will be described later.

The color inference unit 105 outputs the generated color feature vector 304 to the concatenation unit 106.

The concatenation unit 106 concatenates the feature vectors output by the first feature inference unit 102, the second feature inference unit 103, the gender inference unit 104, and the color extraction unit 105 with each other, embeds these feature vectors in a multi-dimensional feature space (hereinafter referred to as a feature space), to generate a compounded feature vector 311 (corresponding to concatenation 31 in FIG. 3A). That is to say, the concatenation unit 106 generates a compounded feature vector 311 by concatenating the first feature vector 301, the second feature vector 302, the gender feature vector 303, and the color feature vector 304 with each other, and embedding the concatenated feature vector into a single (common) feature space.

As will be described later, the first feature vector 301 is expressed in 200 dimensions (200D), the second feature vector 302 is expressed in 153 dimensions (153D), the gender feature vector 303 is expressed in four dimensions (4D), and the color feature vector 304 is expressed in six dimensions (6D). Therefore, the compounded feature vector 311 is expressed in 363 dimensions (363D).

In the compounded feature vector 311, as shown in FIG. 3A, the gender feature vector 303, the second feature vector 302, the color feature vector 304, and the first feature vector 301 are concatenated in this order. This order of concatenation is an example, and the order is not limited to this order.

The concatenation unit 106 outputs the generated compounded feature vector 311 to the similarity search unit 107.

Using the compounded feature vector 311 generated by the concatenation unit 106 as an input, the similarity search unit 107 searches for similar images that are similar to the product image acquired by the acquisition unit 101. In the present embodiment, the similarity search unit 107 carries out a similar image search in the feature space. The similarity search unit 107 is configured to search for similar images using, for example, a known nearest neighbor search engine. For example, an engine that employs the FAISS (Facebook AI Similarity Search) algorithm is known as a nearest neighbor search engine. Note that the entirety or a part of the configuration of the similarity search unit 107 may be provided outside the information processing apparatus 100 so as to be associated therewith.

The output unit 109 outputs information including one or more images (similar images) corresponding to one or more image IDs that are the results of the search carried out by the similarity search unit 107. For example, the output unit 109 may provide such information via a communication I/F 507 (FIG. 5).

The training unit 108 trains the first feature predictive model 111, the second feature predictive model 112, the gender predictive model 113, and the segment extraction model 114, and stores these trained learning models in the learning model storage unit 110.

Figure 4:
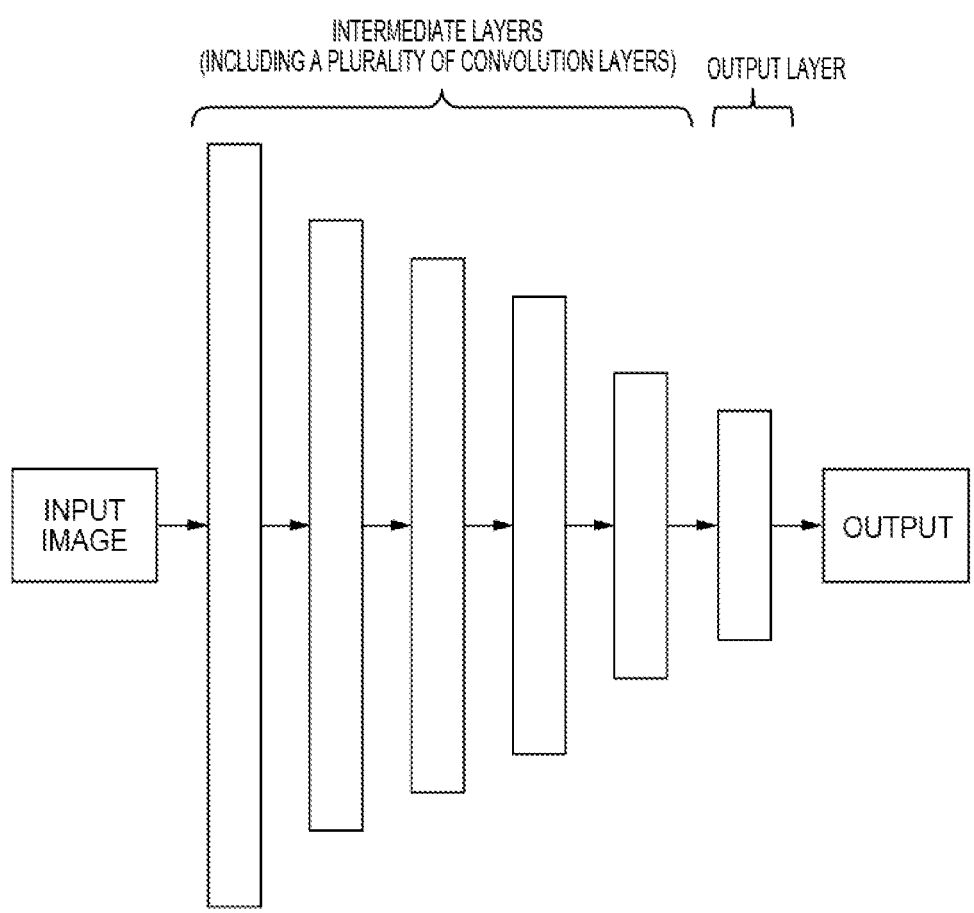
FIG. 4 shows a schematic architecture of an image recognition model.

In the present embodiment, the first feature predictive model 111, the second feature predictive model 112, and the gender predictive model 113 are each a learning model for machine learning that employs an image recognition model. FIG. 4 shows a schematic architecture of the image recognition model. The segment extraction model 114 will be described later.

As shown in FIG. 4, the image recognition model according to the present embodiment includes intermediate layers that include a plurality of convolution layers, and an output layer used to classify/predict classes, and outputs feature vectors predicted based on an input product image. For example, the EfficientNet model by Google Research is used for intermediate layers. When EfficientNet is used, MBConv (Mobile Inverted Bottleneck Convolution) is used for each convolution layer. The layers are configured such that a feature map is extracted in the intermediate layers, and the ultimate feature vector is generated in the output layer while the number of dimensions of the map is reduced. Note that the number of convolution layers is not limited to a specific number.

The first feature predictive model 111, the second feature predictive model 112, and the gender predictive model 113 may each employ the architecture of the image recognition model shown in FIG. 4, and respectively output the first feature vector 301, the second feature vector 302, and the gender feature vector 303.

The first feature predictive model 111, the second feature predictive model 112, and the gender predictive model 113 are each subjected to training processing using individual training (teacher) data. Here, training processing that these learning models are subjected to will be described.

First feature predictive model 111: A model that predicts the first feature (a category (an upper-level classification of the product)) from the product image and outputs the first feature vector 301. Combinations of a product image (an input image) and the category of the product serving as correct answer data are used as training data. In training data, the categories of products have been set in advance, and it is assumed that there are 200 different categories in the present embodiment. Examples of the categories of fittings include men's fashion, ladies' fashion, fashion goods, innerwear, shoes, accessories, and watches, as mentioned above. Categories may also include food, gardening, computers/peripherals, and so on.

In the present embodiment, the first feature predictive model 111 is configured to be able to classify 200 different categories, and the first feature vector 301 is a vector that can express 200 dimensions.

Second feature predictive model 112: A model that predicts the second feature (a genre (a lower-level classification of the product)) from the product image and outputs the second feature vector 302. Combinations of a product image (an input image) and the genre of the product serving as correct answer data are used as training data. In training data, the genres of products have been set in advance in association with the categories that are upper-level classifications.

In the present embodiment, the second feature predictive model 112 is configured to be able to infer 153 different genres for each first feature vector 301 (category) generated by the first feature inference unit 102, and the second feature vector 302 is a vector that can express 153 dimensions.

Alternatively, the second feature predictive model 112 may be configured to infer the first feature to generate a first feature vector 301, and infer the second feature to generate a second feature vector 302 based on the first feature.

Gender predictive model 113: A model that predicts a gender from the product image and outputs the gender feature vector 303. Combinations of a product image (an input image) and gender information regarding the gender targeted by the product, which serves as correct answer data, are used as training data. As described above, in the present embodiment, examples of genders include not only male and female but also kid and unisex. In training data, gender features corresponding to products have been set in advance.

The gender predictive model 113 is configured to be able to infer four different genders (male, female, kid, and unisex), and the gender feature vector 303 is a vector that can express four dimensions.

Note that the gender predictive model 113 may be configured to predict gender based on the first feature vector 301 and/or the second feature vector 302 rather than from the image recognition model shown in FIG. 4, and generate and output the gender feature vector 303.

Processing Performed by Color Extraction Unit 105 and Architecture of Segment Extraction Model 114

Next, the processing performed by the color extraction unit 105 will be described together with the segment extraction model 114.

Figure 5A:
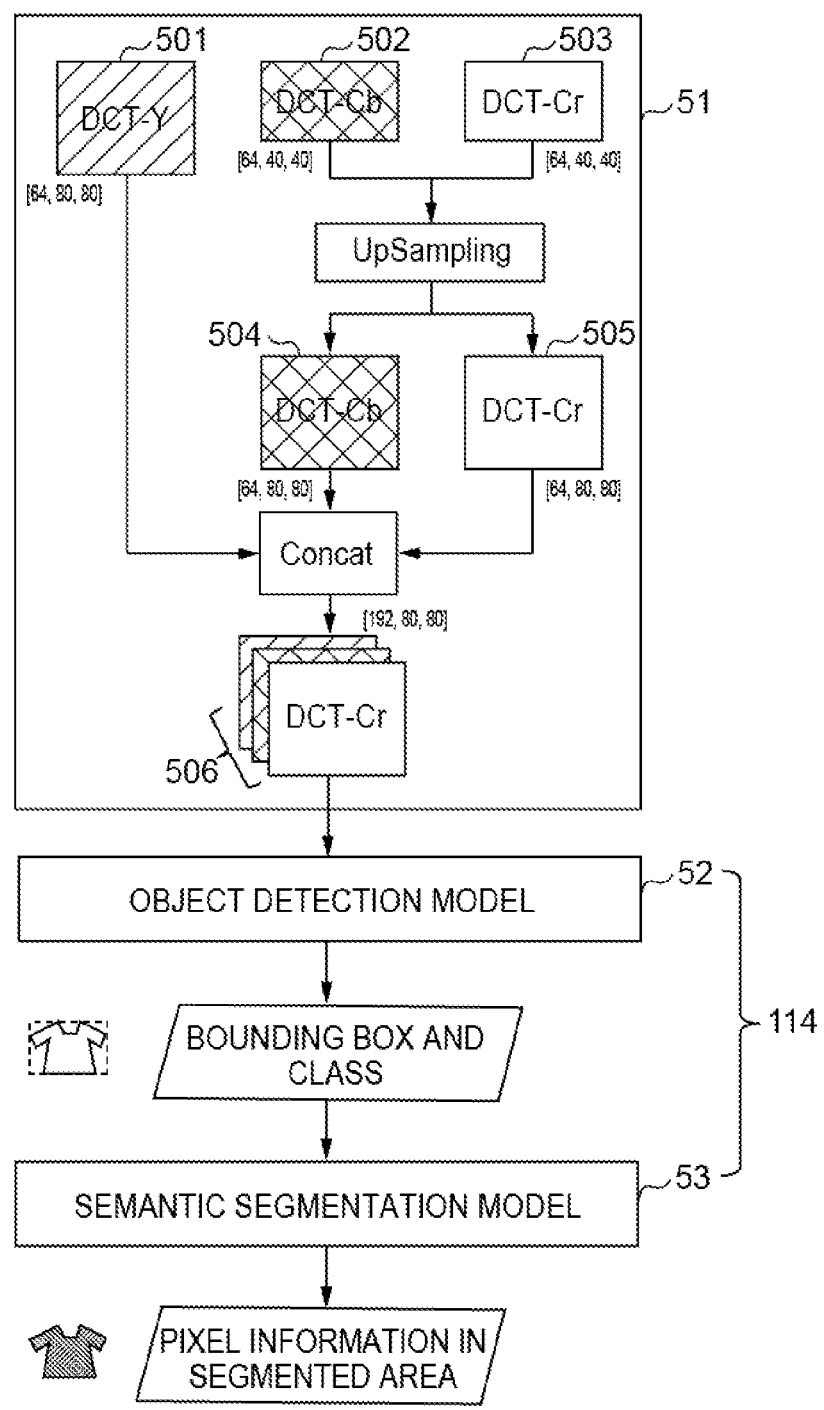
FIG. 5A is a conceptual diagram showing a flow of processing that is performed by a color extraction unit.

FIG. 5A is a conceptual diagram showing a flow of the processing performed by the color extraction unit 105 according to the present embodiment. In the present embodiment, the color extraction unit 105 is configured to use data generated by converting an RGB image to a YCbCr image and further performing DCT-conversion on the YCbCr image, as an input product image, to extract the colors of the product. Such conversion processing may be performed by the acquisition unit 101 or a device other than the information processing apparatus 100.

A block 51 shown in FIG. 5A represents processing that is performed from when product images are acquired by the color extraction unit 105 to when the images are input to the segment extraction model 114. The input images subjected to the YCbCr conversion and the DCT conversion are denoted as DCT-Y501, DCT-Cb501, and DCT-Cr501. For example, the images DCT-Y501, DCT-Cb501, and DCT-Cr501 respectively contain components [64,80,80], [64,40,40], and [64,40,40], and the dimensionalities of each image represent [the number of channels (n_channels), width, height].

Subsequently, the color extraction unit 105 performs upsampling processing on DCT-Cb502 and DCT-Cr503 to generate DCT-Cb504 and DCT-Cr505. Thereafter, the color extraction unit 105 concatenates DCT-Y501, DCT-Cb504, and DCT-Cr505 channel-wise to generate concatenated DCT data 506. That is to say, the sizes of the Y elements, the Cb elements, and the Cr elements are adjusted, and the concatenated DCT data 506 (image data) is generated. The concatenated DCT data 506 is input to the segment extraction model 114.

The segment extraction model 114 includes an object detection model 52 and a semantic segmentation model 53. The object detection model 52 is, for example, a YOLO (You Only Look Once) learning model. The semantic segmentation model 53 is a learning model that is constituted by a neural network such as an FCN (Fully Convolutional Network).

The object detection model 52 is a learning model that uses the concatenated DCT data 338 as input to infer (predict) a bounding box of at least one object contained in the input image (a rectangular area that surrounds the object) and the type (class) of the object. Here, not only the bounding box and type of the object to be searched for (i.e., the product to be searched for) but also the bounding box and type of an object that is not to be searched for may be included. The inferred bounding box and type are input to the semantic segmentation model 35.

The semantic segmentation model 35 is a learning model that uses the inferred bounding box and class as inputs to infer (predict) the area (segmentation) of the product to be searched for (the target object). In the present embodiment, the semantic segmentation model 35 is configured to output pixel information regarding the segmented area (i.e., the product area). Note that the semantic segmentation model 35 may be configured to use only the inferred bounding box as an input to output pixel information regarding the segmented area.

Figure 5B:
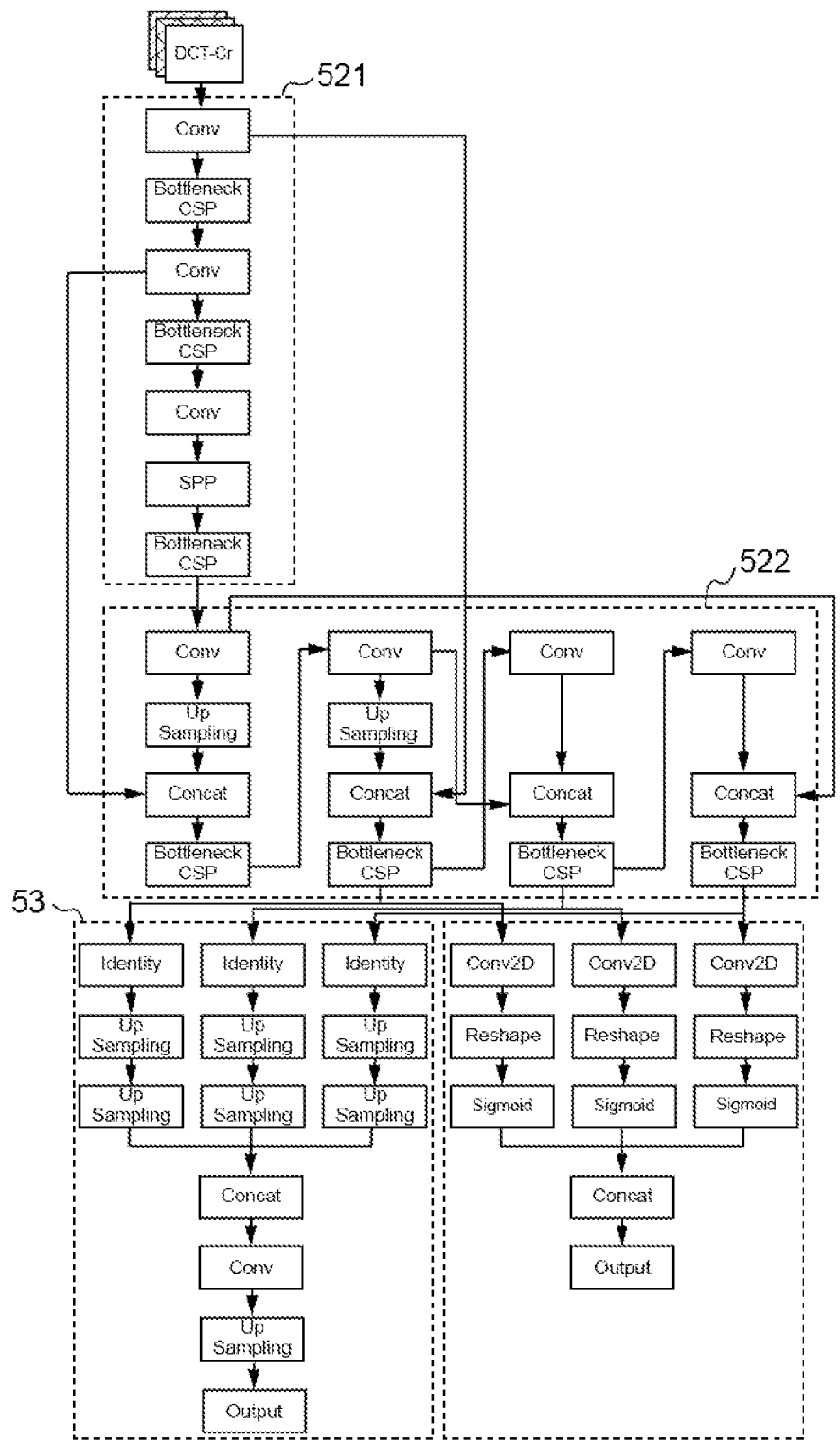
FIG. 5B shows an example of an architecture of a segment extraction model.

FIG. 5B shows an example of an architecture of the segment extraction model 114. As described above, the segment extraction model 114 includes the object detection model 52 and the semantic segmentation model 53.

The object detection model 52 includes a backbone section 521 for pre-training and a head section 522 for inferring the bounding box and the class (type). Here, Cony indicates a convolutional layer, Bottleneck CSP (Cross Stage Partial Network) indicates a layer that formulates a feature, and SPP (Spatial Pyramid Pooling) indicates a pooling layer. In the semantic segmentation model 531. Identity indicates an activation function that performs nothing in particular.

The object detection model 52 and the semantic segmentation model 35 are trained by the training unit 108, using any given product images as training data.

Next, processing through which colors of the segmented area (the product area) are extracted from pixel information regarding the area, generated as described above, to generate a color feature vector 304 will be described. FIG. 5C shows a flow of the color extraction processing.

The color extraction unit 105 acquires pixel information (S51), and subsequently extracts colors in a color palette, using a color map, for each pixel (S52). In S52, for example, the color extraction unit 105 converts the segmented area (from RGB or YCbCr) into a Lab color space to express the colors of all the pixels in the area as color values. Note that the colors in the color palette are also converted into those in the Lab color space. The color extraction unit 105 can determine the distance (difference) between two color values for each pixel to extract the color of each pixel.

Next, the color extraction unit 105 selects the top two colors as the primary color (first color) and the secondary color (second color) from among the colors extracted from all the pixels in the area (S53), and outputs color information vector 304 that includes RGB information regarding the two colors (S54). By extracting not only one color but the top two colors of the colors that exclusively occupy the area showing the product, even if the area contains a plurality of colors like a dot pattern or a checkered pattern, it is possible to generate a color information vector 304 that more precisely reflects information regarding the colors in the area, to perform a similar image search.

As described above, in the present embodiment, the color information vector 304 is a vector that can express six dimensions, i.e., 3 (RGB)×2 (the primary color and the secondary color).

Although the top two colors are extracted in the present embodiment, a predetermined number of colors from the top color may be extracted.

Hardware Configuration of Information Processing Apparatus 100

Figure 6:
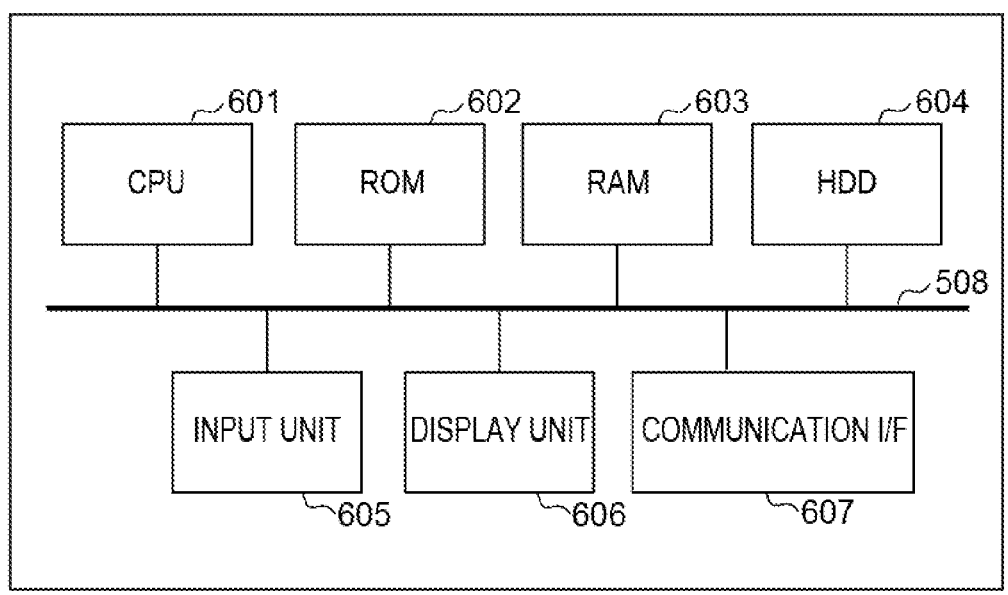
FIG. 6 is a block diagram showing an example of a hardware configuration of the information processing apparatus according to an embodiment of the present invention.

FIG. 6 is a block diagram showing an example of a hardware configuration of the information processing apparatus 100 according to the present embodiment.

The information processing apparatus 100 according to the present embodiment can be implemented on one or more computers of any type, one or more mobile devices of any type, and one or more processing platforms of any type.

Although FIG. 6 shows an example in which the information processing apparatus 100 is mounted on a single computer, the information processing apparatus 100 according to the present embodiment may be mounted on a computer system that includes a plurality of computers. The plurality of computers may be connected to each other via a wired or wireless network so as to be able to communicate with each other.

As shown in FIG. 6, the information processing apparatus 100 may include a CPU 601, a ROM 602, a RAM 603, an HDD 604, an input unit 605, a display unit 606, a communication I/F 607, and a system bus 608. The information processing apparatus 100 may also be provided with an external memory.

The CPU (Central Processing Unit) 601 performs overall control on the operation of the information processing apparatus 100, and controls each of the components (602 to 607) via the system bus 608, which is a data transmission line.

The ROM (Read Only Memory) 602 is a non-volatile memory that stores a control program or the like required for the CPU 601 to perform processing. Note that the program may be stored in a non-volatile memory such as an HDD (Hard Disk Drive) 604 or an SSD (Solid State Drive), or an external memory such as a removable storage medium (not shown).

The RAM (Random Access Memory) 603 is a volatile memory and functions as a main memory, a work area, or the like of the CPU 601. That is to say, the CPU 601 loads a required program or the like from the ROM 602 into the RAM 603 when performing processing, and executes the program or the like to realize various functional operations.

The HDD 604 stores, for example, various kinds of data and various kinds of information required for the CPU 601 to perform processing using a program. Also, the HDD 604 stores, for example, various kinds of data and various kinds of information obtained as a result of the CPU 601 performing processing using a program or the like.

The input unit 605 is constituted by a keyboard or a pointing device such as a mouse.

The display unit 606 is constituted by a monitor such as a liquid crystal display (LCD). The display unit 606 may be configured in combination with the input unit 605 to function as a GUI (Graphical User Interface).

The communication I/F 607 is an interface that controls communication between the information processing apparatus 100 and external devices.

The communication I/F 607 provides an interface with the network and communicates with external devices via the network. Various kinds of data, various parameters, and so on are transmitted and received to and from external devices via the communication I/F 607. In the present embodiment, the communication I/F 607 may perform communication via a wired LAN (Local Area Network) that conforms to a communication standard such as Ethernet (registered trademark), or a dedicated line. However, the network that can be used in the present embodiment is not limited to these networks, and may be constituted by a wireless network.

Examples of this wireless network include wireless PANs (Personal Area Networks) such as Bluetooth (registered trademark), ZigBee (registered trademark), and UWB (Ultra Wide Band). Examples of the wireless network also include wireless LAN (Local Area Networks) such as Wi-Fi (Wireless Fidelity) (registered trademark) and wireless MANs (Metropolitan Area Networks) such as WiMAX (registered trademark). Furthermore, the examples include wireless WANs (Wide Area Networks) such as LTE/3G, 4G, and 5G. The network need only be able to connect devices so as to be able to communicate with each other, and the communication standard, the scale, and the configuration thereof are not limited to the above examples.

At least some of the functions of the constituent elements of the information processing apparatus 100 shown in FIG. 6 can be realized by the CPU 601 executing a program. However, at least some of the functions of the constituent elements of the information processing apparatus 100 shown in FIG. 6 may be configured to operate as dedicated hardware. In this case, the dedicated hardware operates under the control of the CPU 601.

Hardware Configuration of User Device 10

The hardware configuration of the user device 10 shown in FIG. 1 may be the same as that shown in FIG. 6. That is to say, the user device 10 may include a CPU 601, a ROM 602, a RAM 603, an HDD 604, an input unit 605, a display unit 606, a communication I/F 607, and a system bus 608. The user device 10 can display various kinds of information provided by the information processing apparatus 100 on the display unit 606, and perform processing corresponding to an input operation received from the user via a GUI (a component constituted by the input unit 605 and the display unit 606).

The user device 10 may be provided with a camera (not shown), and is configured to perform image capturing processing under the control of the CPU 601 according to a user operation.

Processing Flow

FIG. 7 shows a flowchart of processing that is performed by the information processing apparatus 100 according to the present embodiment. The processing shown in FIG. 6 can be realized by the CPU 601 of the information processing apparatus 100 loading a program stored in the ROM 602 or the like into the RAM 603 and executing the program.

In S71, the acquisition unit 101 acquires a product image that serves as a query image. For example, the acquisition unit 101 can acquire the product image by acquiring the image or the URL indicating an image included in a search query transmitted from the user device 10.

S72 to S75 are processing steps performed to generate (infer) feature vectors (the first feature vector 301, the second feature vector 302, the gender feature vector 303, and the color feature vector 304) for the product image acquired in S71. The processing steps S72 to S75 may be performed in an order different from the order shown in FIG. 6, or performed in parallel.

In S72, the first feature inference unit 102 applies the product image acquired by the acquisition unit 101 to the first feature predictive model 111 to generate a first feature vector 301. As described above, in the present embodiment, the first feature predictive model 111 is configured to be able to infer 200 different first features (categories), and the first feature vector 301 is a vector that can express 200 dimensions.

In S73, the second feature inference unit 103 applies the product image acquired by the acquisition unit 101 to the second feature predictive model 112 to generate a second feature vector 302. As described above, in the present embodiment, the second feature predictive model 112 is configured to be able to infer 153 different second features (genres) for each first feature (category), and the second feature vector 302 is a vector that can express 153 dimensions. The second feature vector 302 may be configured to have a plurality of levels. For example, if the product category inferred by the first feature inference unit 102 is women's fashion, the product genre to be inferred by the second feature inference unit 103 may be configured to have two levels, i.e., from the upper level to the lower level, of women's fashion_bottoms/pants.

In S74, the gender inference unit 104 applies the product image acquired by the acquisition unit 101 to the gender predictive model 113 to generate a gender feature vector 303. As described above, in the present embodiment, the gender predictive model 113 is configured to be able to infer four different genders (male, female, kid, and unisex), and the gender feature vector 303 is a vector that can express four dimensions.

In S75, the color extraction unit 105 generates a color feature vector 304 from the product image acquired by the acquisition unit 101. The processing performed to generate a color feature vector 304 is as described above, and the color feature vector 304 is a vector that can express six dimensions.

Upon the inference of each feature vector being complete through S72 to S75, processing proceeds to S76. In S76, the concatenation unit 106 concatenates the first feature vector 301, the second feature vector 302, the gender feature vector 303, and the color feature vector 304 output in S72 to S75, and embeds the concatenated vector into a feature space to generate a compounded feature vector 311.

In S77, the similarity search unit 107 receives the compounded feature vector 311 generated by the concatenation unit 106 as an input, and searches for images (similar images) that are similar to the product image acquired by the acquisition unit 101. The search processing (neighborhood search processing) can be performed using the FAISS (Facebook AI Similarity Search) algorithm. FAISS is a neighborhood search algorithm that employs LSH (Locality Sensitive Hashing).

Before performing the search processing, the similarity search unit 107 generates a compounded feature vector 311 for each of the plurality of product images that serve as training data. Here, each product image is provided with an image ID (index/identifier) for identifying the image. It is assumed that the similarity search unit 107 stores the compounded feature vector 311 in the search database 115 while associating (mapping) the compounded feature vector 311 with the image ID of the product image indicated by the vector. The format of the image ID is not limited to a specific format, and may be information corresponding to a URL.

The similarity search unit 107 calculates the similarity (Euclidean distance) in a single (common) feature space between each of the plurality of compounded feature vectors stored in the search database 115 and the compounded feature vector 311 generated by the concatenation unit 106, and acquires one or more compounded feature vectors similar to the compounded feature vector 311. Such processing corresponds to nearest neighbor search processing. Subsequently, the similarity search unit 107 acquires one or more image IDs corresponding to the acquired one or more similar compounded feature vectors, and outputs similar images corresponding to the image IDs.

If a compounded feature vector 311 has been once generated by the concatenation unit 106 and the compounded feature vector 311 is associated by the similarity search unit 107 with the image ID, it is possible to search for similar images without performing the processing to generate four feature vectors.

For example, if there is a compounded feature vector corresponding to the image ID of the product image associated with the search query received from the user device 10, the similarity search unit 107 can retrieve the corresponding compounded feature vector based on the image ID from the search database 115, and search for similar images based on the corresponding compounded feature vector.

Figure 3B:
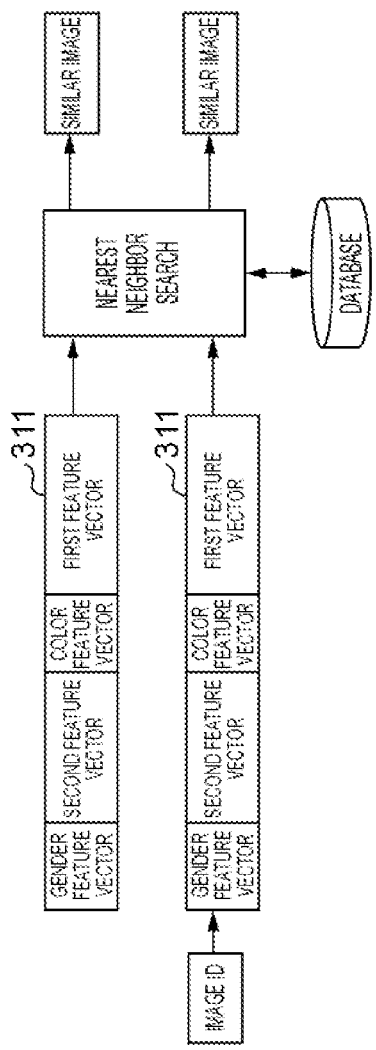
FIG. 3B is a conceptual diagram showing similarity search processing.

FIG. 3B is a conceptual diagram for the similar image search processing in S77 described above. As shown in FIG. 3B, nearest neighbor search processing is performed based on the compounded feature vector 311 generated from the product image or the compounded feature vector 311 retrieved based on the image ID of the product image. In the nearest neighbor search processing, compounded feature vectors with a high degree of similarity to the compounded feature vector 311 are searched for. In the present embodiment, a vector whose Euclidean distance to the compounded feature vector 311 in the feature space is short is determined to have a high degree of similarity. Thereafter, images with the image IDs corresponding to the retrieved compounded feature vectors are searched for in an image ID database (included in the search database 115), and the retrieved images are output as similar images.

The similarity search unit 107 may sequentially read feature vectors from the beginning of the compounded feature vector 311 and perform a similarity search. For example, as shown in FIG. 3A, if a gender feature vector 303, a second feature vector 302, a color feature vector 304, and a first feature vector 301 are concatenated with each other in this order in a compounded feature vector 311, the similarity search unit 107 can first read out the gender feature vector 303 to perform search processing, and subsequently read the second feature vector 302 to perform search processing.

In S78, the output unit 109 outputs (distributes) information that includes images (similar images) corresponding to one or more image IDs that are the results of the search performed by the similarity search unit 107, to the user device 10. That is to say, the acquisition unit 101 provides the user device 10 with information that includes similar images, as a response (search results) to the search query received from the user device 10.

Examples of Screens on User Device 10

Figure 8A:
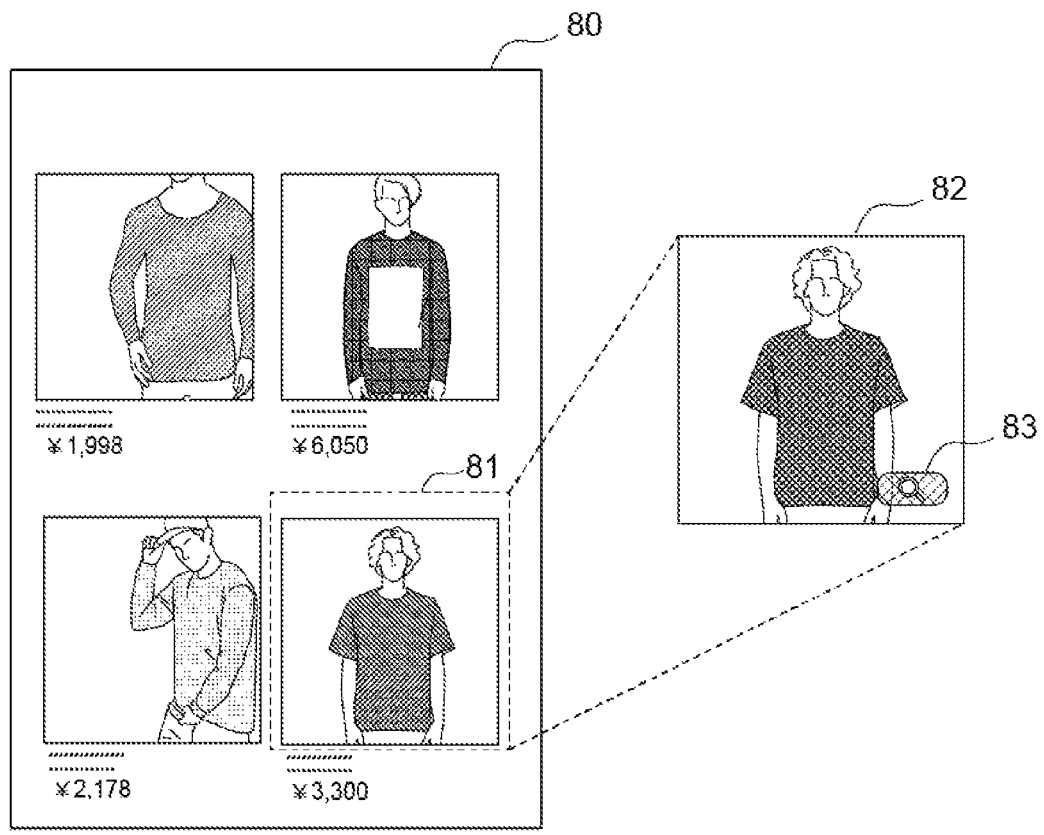
FIG. 8A shows an example of a screen displayed on a user device according to a first embodiment.
Figure 8B:
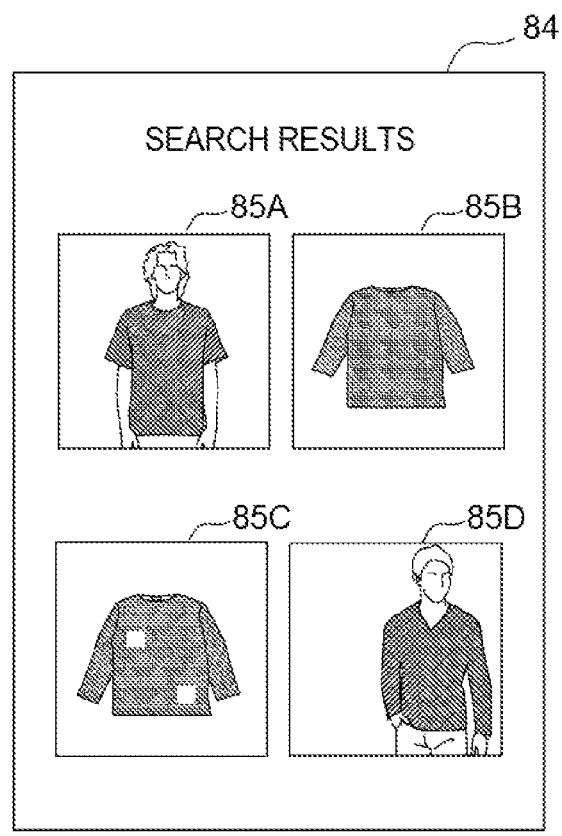
FIG. 8B shows an example of a screen displayed on the user device according to the first embodiment.

Next, examples of screens displayed on the user device 10 according to the present embodiment will be described with reference to FIGS. 8A and 8B. FIGS. 8A and 8B show examples of screens displayed on the user device 10 according to the present embodiment. A screen 80 is an example of a screen displayed on the display unit 606 of the user device 10. For example, the user operates the user device 10 to access a desired electronic commerce site (website such as an EC site) and input and transmit a desired search word to the information processing apparatus 100. As a result, data of the screen 80 is provided and displayed on the display unit 606 of the user 10.

Upon the user selecting an area 81 on the screen 80 (examples of selection operations includes a press operation, a touch operation, and so on; the same applies hereinafter), a product image 82 in the area 81 and a search button 83 for the product image 82 are displayed. The search button 83 is displayed so as to be selectable. At this time, if the user further selects the search button 83, a search query associated with the product image 82 serving as a query image is transmitted to the information processing apparatus 100. The image ID attached to the product image 82 may also be included in the search query and transmitted.

The information processing apparatus 100 upon receiving the search query generates a first feature vector 301, a second feature vector 302, a gender feature vector 303, and a color feature vector 304 from the product image 82 associated with the search query. Subsequently, the information processing apparatus 100 generates a compounded feature vector 311 from the four feature vectors, searches for one or more similar images based on the compounded feature vector 311, and outputs the search results (one or more similar images and various kinds of information related to the images) to the user device 10.

FIG. 8B shows an example of a screen displayed on the display unit 606, on which the search results received by the user device 10 from the information processing apparatus 100 are displayed. In this example, it is assumed that four similar images 85A to 85D are retrieved based on the product image 82, and the four similar images 85A to 85D are displayed on the screen 84. Although only the images are shown on the screen 84, various kinds of information such as prices and pieces of attribute information related to the images may also be displayed. If the EC site is a mall-type EC site (an EC site like a shopping mall on the Web) and the products included in the product image 82 are dealt with by different sellers, product images 82 with different prices and different sellers may be retrieved as similar images. Also, a similar image in which the product included in the product image 82 is displayed in a different layout may be retrieved.

As described above, the information processing apparatus 100 according to the present embodiment accurately extracts the product area from the product image and extracts the colors of the product area to generate a color feature vector that is more suitable for the product. Also, the information processing apparatus 100 searches for similar images based on a compounded feature vector in which a plurality of feature vectors including the color feature vector are concatenated with each other. As a result, it is possible to search for similar images from the viewpoint of every feature of the product, provide similar images with higher accuracy than before, and improve usability.

Although the above embodiment describes an example in which a compounded feature vector 311 is generated from four feature vectors, the number of feature vectors that are concatenated with each other is not limited to four. For example, a compounded feature vector 311 may be generated from the second feature vector 302 and the color feature vector 304, and similar images may be searched for based on the compounded feature vector 311. Also, it is possible to employ a configuration with which similar images are searched for based on the compounded feature vector 311 in which another feature vector generated through machine learning is concatenated.

Second Embodiment

In the first embodiment, the user device 10 selects one product image on a website such as an EC site, and the information processing apparatus 100 searches for similar images similar to the selected product image and provides the similar images to the user device 10.

Meanwhile, if the user device 10 is equipped with a camera (an image capturing means), the user may search for products similar to the product included in the product image captured by the camera as well in addition to searching them from the products dealt with on the accessed EC site, and consider purchasing the product. In addition, the user may select a desired image from images already captured by a camera and stored in the storage unit of the user device 10, or images acquired from an external device, and search for products similar to the product included in the selected image to consider purchasing such products.

Therefore, the present embodiment describes an example in which the user searches for similar images based on an image captured with a camera or an image selected from the storage unit of the user device 10. Note that, in the present embodiment, the descriptions of matters common to those in the first embodiment will be omitted.

The configuration of the information processing apparatus 100 according to the present embodiment is the same as that in the first embodiment. Also, the flow of processing performed by the information processing apparatus 100 according to the present embodiment is the same as that of the processing shown in FIG. 6 described in the first embodiment. The product image serving as a query image in the first embodiment corresponds to an image captured by the user device 10 or an image selected from the storage unit.

Examples of Screens on User Device 10

Figure 9A:
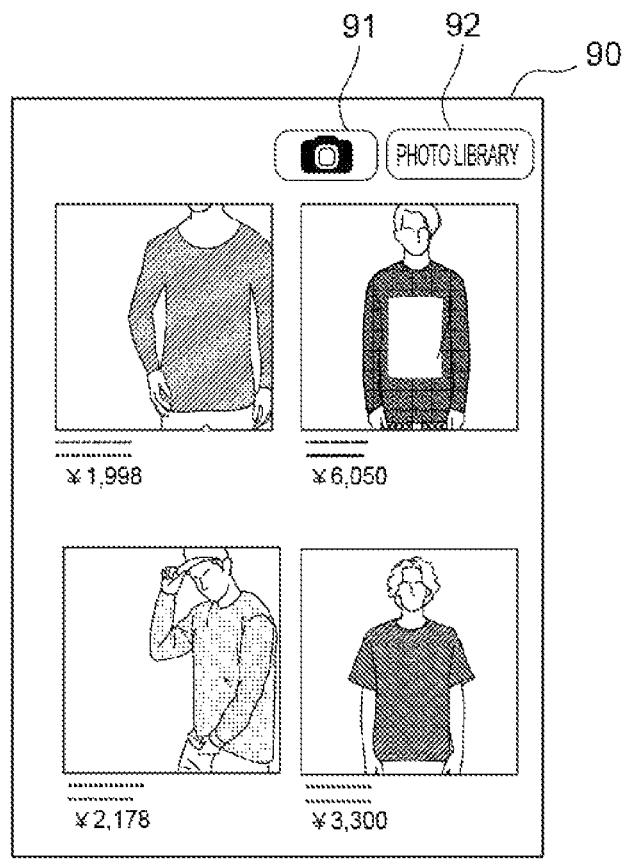
FIG. 9A shows an example of a screen displayed on a user device according to a second embodiment.
Figure 9B:
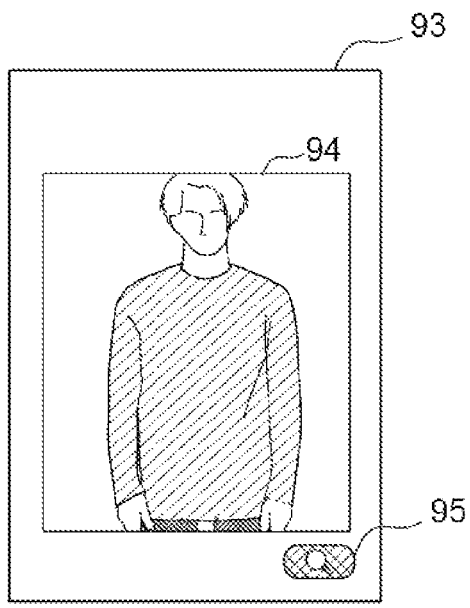
FIG. 9B shows an example of a screen displayed on the user device according to the second embodiment.
Figure 9C:
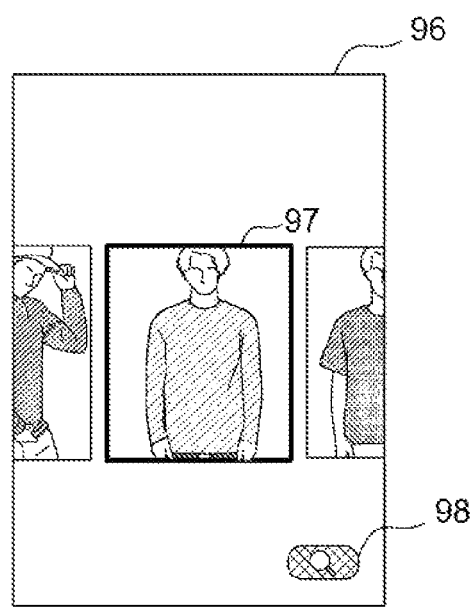
FIG. 9C shows an example of a screen displayed on the user device according to the second embodiment.

Next, examples of screens displayed on the user device 10 according to the present embodiment will be described with reference to FIGS. 9A to 9C. FIGS. 9A to 9C show examples of screens displayed on the user device 10 according to the present embodiment. A screen 90 in FIG. 9A is an example of a screen displayed on the display unit 606 of the user device 10. For example, the user operates the user device 10 to access a desired electronic commerce site (an EC site) and input and transmit a desired search word to the information processing apparatus 100. As a result, information regarding the screen 90 is provided and displayed on the display unit 606 of the user device 10.

In addition, the CPU 601 of the user device 10 performs control so that a camera button 91 and a photo library button 92 are also displayed on the display unit 606 of the user device 10 in response to a user operation. In the example shown in FIG. 9A, control is performed so that the camera button 91 and the photo library button 92 are displayed on the screen 90 provided by the information processing apparatus 100. However, the camera button 91 and the photo library button 92 need only be displayed on a screen that is associated with the EC site accessed by the user. Also, the camera button 91 and the photo library button 92 may be configured in other forms, such as being constituted by physical buttons.

The camera button 91 is a button used to start up a camera function (a camera application) provided in the user device 10. Upon the camera button 91 being selected, the user device 10 enters a state (an image capturing mode) in which the user device 10 can capture an image of a desired subject.

The photo library button 92 is a button used to browse one or more images stored in the storage unit of the user device such as the RAM 603. Upon the photo library button 92 being selected, one or more images stored in the storage unit are displayed on the display unit 606 of the user device 10.

FIG. 9B shows an example of a screen when the user selects the camera button 91 on the screen 90 in FIG. 9A and captures an image that serves as a query image used to search for similar images. In a screen 93 shown in FIG. 9B, an image 94 is the captured image. Also, in the screen 93, a search button 95 for the image 94 is displayed. The search button 95 is displayed so as to be selectable. In this state, if the user selects the search button 95, a search query associated with the image 94 serving as a query image is transmitted to the information processing apparatus 100.

The information processing apparatus 100 upon receiving the search query generates a first feature vector 301, a second feature vector 302, a gender feature vector 303, and a color feature vector 304 from the image 94 associated with the search query. Subsequently, the information processing apparatus 100 generates a compounded feature vector 311 from the four feature vectors, searches for one or more similar images based on the compounded feature vector 311, and outputs the search results (one or more similar images and various kinds of information related to the images) to the user device 10.

FIG. 9C shows an example of a screen when the user selects the photo library button 92 on the screen 90 in FIG. 9A. A screen 96 shown in FIG. 9C displays captured images stored in the storage unit of the user device 10 or images acquired from an external device. The user can change the one or more images displayed on the screen 96 by swiping the screen 96 to the right or left, for example. In the screen 96, an image 97 displayed in the center serves as a query image. Also, in the screen 96, a search button 98 for the image 97 is displayed. The search button 98 is displayed so as to be selectable.

If the user selects the search button 98 in the state shown in the screen 96, a search query associated with the image 97 serving as a query image is transmitted to the information processing apparatus 100. In the example in FIG. 9C, the image displayed in the center of the screen 96 is used as the query image. However, the query image may be selected from one or more images stored in the storage unit of the user device 10.

The information processing apparatus 100 upon receiving the search query generates a first feature vector 301, a second feature vector 302, a gender feature vector 303, and a color feature vector 304 from the image 97 associated with the search query. Subsequently, the information processing apparatus 100 generates a compounded feature vector 311 from the four feature vectors, searches for one or more similar images based on the compounded feature vector 311, and outputs the search results (one or more similar images and various kinds of information related to the images) to the user device 10.

As described above, according to the present embodiment, the query image is selected from among images captured by the user, images already captured, or images acquired from an external device, instead of from images on the website such as an EC site. As a result, the user can more freely select a query image and search for similar images similar to the query image, which contributes to improvement in usability.

Third Embodiment

In the first embodiment, the user device 10 selects one product image on a website such as an EC site, and the information processing apparatus 100 searches for similar images similar to the selected product image and provides the similar images to the user device 10. In the second embodiment, the user device 10 selects one image from among images captured by the device and images already acquired, and the information processing apparatus 100 searches for similar images similar to the selected image and provides the similar images to the user device 10. The present embodiment describes an example in which the first embodiment and the second embodiment are combined.

Note that, in the present embodiment, the descriptions of matters common to those in the first embodiment and the second embodiment will be omitted.

The configuration of the information processing apparatus 100 according to the present embodiment is the same as that in the first embodiment. Also, the flow of processing performed by the information processing apparatus 100 according to the present embodiment is the same as that of the processing shown in FIG. 6 described in the first embodiment.

However, the processing performed by the similarity search unit 107 is different from that in the above-described embodiments. The user device 10 transmits a search query in which a product image that serves as a query image and an image that contains text information (text image) selected from the product image are associated with each other, and the similarity search unit 107 of the information processing apparatus 100 searches for similar images, using the product image and the text image.

Examples of Screens on User Device 10

Figure 10A:
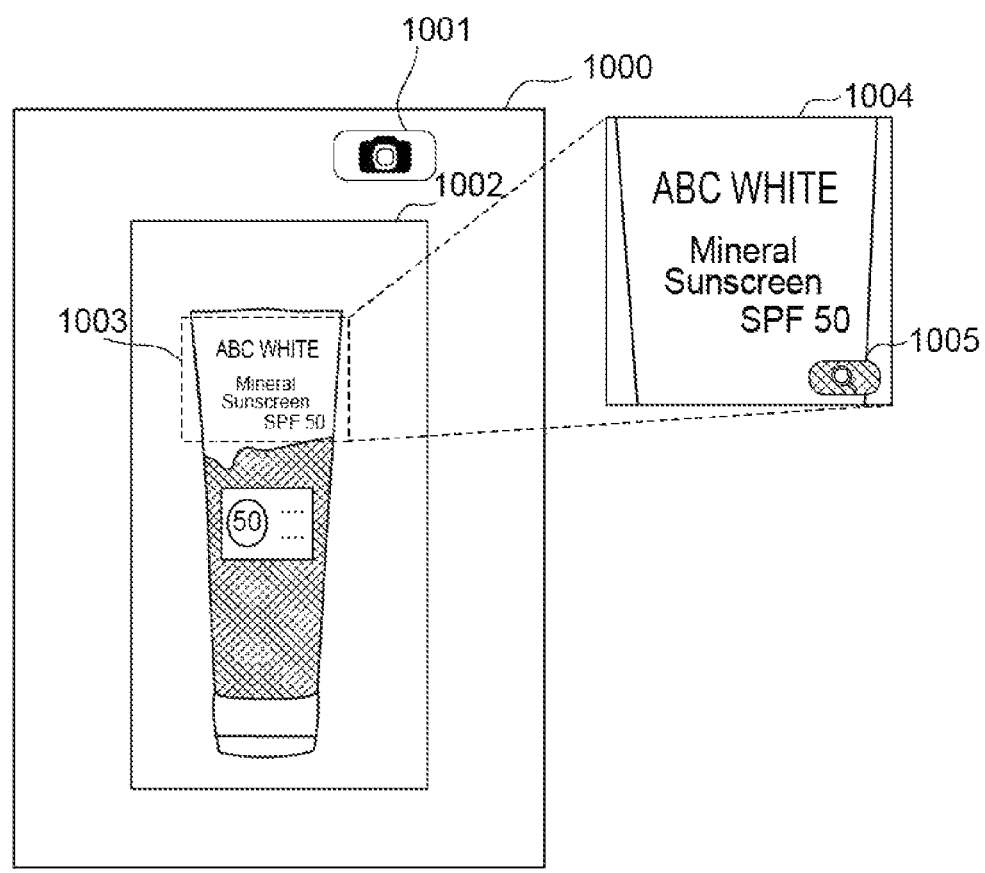
FIG. 10A shows an example of a screen displayed on a user device according to a third embodiment.
Figure 10B:
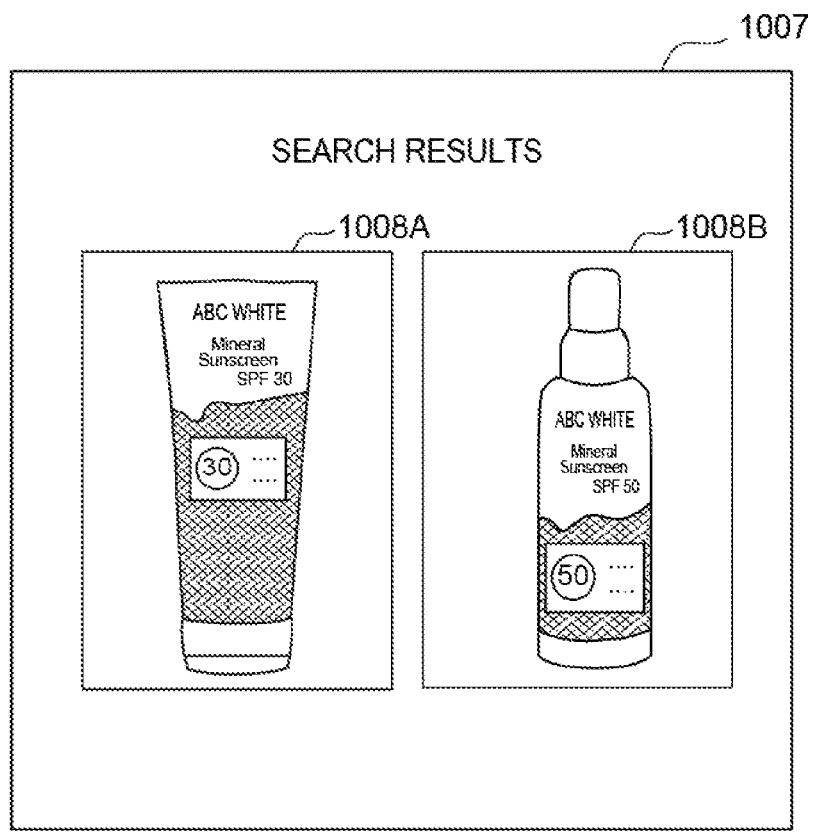
FIG. 10B shows an example of a screen displayed on the user device according to the third embodiment.

Examples of screens displayed on the user device 10 according to the present embodiment will be described with reference to FIGS. 10A and 10B. FIGS. 10A and 10B show examples of screens displayed on the user device 10 according to the present embodiment. A screen 1000 in FIG. 10A is an example of a screen displayed on the display unit 606 of the user device 10. For example, the user operates the user device 10 to access a desired electronic commerce site (an EC site) and input and transmit a desired search word to the information processing apparatus 100. As a result, information regarding the screen 1000 is provided and displayed on the display unit 606 of the user 10.

In addition, the CPU 601 of the user device 10 performs control so that a camera button 81 and a photo library button 82 are also displayed on the display unit 606 of the user device 10 in response to a user operation. The function of the camera button 1001 is the same as the camera button 81 in FIG. 8A.

It is assumed that a product image 1002 is displayed on the screen 1000 in FIG. 10A in response to the user's search operation. Here, it is assumed that the user selects the camera button 1001 to start the image capturing mode and captures an image of an area 1003. An image 1004 displayed on the display unit 606 after the image capturing is an image corresponding to the area 1003, and is an image that contains text information (a text image). Note that the image 1004 is not limited to an image obtained through an image capturing operation, and may be an image obtained through any selection operation performed in response to a user operation. Also, with the image 1004, a search button 1005 for the product image 1002 (or the area 1003) is displayed. The search button 1005 is displayed so as to be selectable.

In this state, if the user selects the search button 1005, a search query associated with the product image 1002 and the image (text image) 1004 is transmitted to the information processing apparatus 100.

The information processing apparatus 100 upon receiving the search query generates a first feature vector 301, a second feature vector 302, a gender feature vector 303, and a color feature vector 304 from the image 1002 associated with the search query. Subsequently, the information processing apparatus 100 generates a compounded feature vector 311 from the four feature vectors.

If a compounded feature vector 311 has already been generated from the image 1002, the similarity search unit 107 searches for and acquires the compounded feature vector 311 based on the image ID.

Next, the similarity search unit 107 analyzes the image 1004 associated with the search query to extract text information. Various known image processing techniques and machine learning can be used to extract the text information. In the present embodiment, the similarity search unit 107 is configured to extract text information (for example, at least one of the product name and the brand name) from the image 1004, using machine learning. In the case of the image 1004, the product name to be extracted is "Mineral Sunscreen" and the brand name to be extracted is "ABC WHITE".

The similarity search unit 107 searches for one or more similar images similar to the image 1004 based on the compounded feature vector 311 and the extracted text information, and outputs search results (one or more similar images and various kinds of information related to the image) to the user device 10.

FIG. 10B shows an example of a screen displayed on the display unit 606, on which the search results received by the user device 10 from the information processing apparatus 100 are displayed. In this example, it is assumed that two similar images 1008A and 1008B are retrieved based on the image 1004, and the two similar images 1008A and 1008B are displayed on a screen 1007. Although the screen 1007 shows only images, various kinds of information such as prices and pieces of attribute information related to the images may also be displayed.

As described above, the information processing apparatus 100 according to the present embodiment infers (predicts) a plurality of attributes (features) of a product based on a product image to generate a plurality of feature vectors, and generates a compounded feature vector in which the plurality of feature vectors are concatenated with each other. Furthermore, the information processing apparatus 100 extracts text information from the text image in the product image. Thereafter, the information processing apparatus 100 searches for similar images based on the compounded feature vector and the text information. As a result, it is possible to provide similar images with higher accuracy than before, and improve usability.

The present embodiment describes the acquisition unit 101 as being configured to acquire one product image. However, if a plurality of images are associated with the search query, or a plurality of search queries are received at a time, the information processing apparatus 100 may perform a similar image search for each of the images.

Although specific embodiments are described above, the embodiments are merely examples and are not intended to limit the scope of the present invention. The devices and the methods described herein may be embodied in forms other than those described above. Also, appropriate omissions, substitutions, and modifications may be made to the above-described embodiments without departing from the scope of the present invention. Embodiments to which such omissions, substitutions, and modifications are made are included in the range of the invention recited in the scope of claims and equivalents thereof, and belong to the technical scope of the present invention.

REFERENCE NUMERALS AND SYMBOLS

10: User Device
100: Information processing apparatus
101: Acquisition Unit
102: First feature inference unit
103: Second feature inference unit
104: Gender inference unit
105: Color Extraction Unit
106: Concatenation Unit
107: Similarity Search Unit
108: Training Unit
109: Output Unit
110: Learning Model Storage Unit
111: First feature predictive model
112: Second feature predictive model
113: Gender predictive model
114: Segment Extraction Model
115: Search Database

The invention claimed is:

1. An information processing apparatus comprising:
at least one memory configured to store program code;
at least one processor configured to access the at least one memory and operate as instructed by the program code, the program code including:
acquisition code configured to cause at least one of the at least one processor to acquire an object image that contains one or more objects;
first inference code configured to cause at least one of the at least one processor to infer one or more rectangular areas that respectively surround the one or more objects in the object image, and a type of each of the one or more objects, by applying the object image to a first learning model;
second inference code configured to cause at least one of the at least one processor to infer an area of a target object in the object image by applying the one or more rectangular areas and the type of each of the one or more objects to a second learning model;
extraction code configured to cause at least one of the at least one processor to extract colors of the target object;
generation code configured to cause at least one of the at least one processor to generate a plurality of feature vectors for the target object by applying a color feature vector indicating the colors of the target object extracted by the extraction unit, and the object image, to a plurality of learning models; and
search code configured to cause at least one of the at least one processor to search for similar images that are similar to the object image of the target object, using the color feature vector and the plurality of feature vectors.

2. The information processing apparatus according to claim 1,
wherein the extraction code is configured to cause at least one of the at least one processor to perform color determination on each pixel in the area of the target object and extracts colors of the target object.

3. The information processing apparatus according to claim 2,
wherein the extraction code is configured to cause at least one of the at least one processor to perform color determination on each pixel in the area of the target object, and extract a predetermined number of top colors from among one or more colors determined in the area of the target object, as the colors of the target object.

4. The information processing apparatus according to claim 1,
wherein the first learning model is a YOLO (You Only Look Once) learning model.

5. The information processing apparatus according to claim 1,
wherein the second learning model is a learning model constituted by an FCN (Fully Convolutional Network).

6. The information processing apparatus according to claim 1, wherein the object image is image data generated from a Y element, a Cb element, and a Cr element of data generated from a YCbCr image through a DCT conversion.

7. The information processing apparatus according to claim 6,
wherein the image data is data generated by adjusting sizes of Y elements, Cb elements, and Cr elements of pieces of data subjected to DCT conversion, and concatenating the pieces of data with each other.

8. The information processing apparatus according to claim 1, further comprising:
concatenation code configured to cause at least one of the at least one processor to concatenate and embed the color feature vector and the plurality of feature vectors into a common feature space to generate a compounded feature vector in the feature space,
wherein the search code is configured to cause at least one of the at least one processor to search for similar images that are similar to the object image of the target object, using the compounded feature vector.

9. An information processing method performed by at least one processor and comprising:
acquiring an object image that contains one or more objects;
inferring one or more rectangular areas that respectively surround the one or more objects in the object image, and a type of each of the one or more objects, by applying the object image to a first learning model;
inferring an area of a target object in the object image by applying the one or more rectangular areas and the type of each of the one or more objects to a second learning model;
extracting colors of the target object;
generating a plurality of feature vectors for the target object by applying a color feature vector indicating the colors of the target object extracted by the extraction unit, and the object image, to a plurality of learning models; and
searching for similar images that are similar to the object image of the target object, using the color feature vector and the plurality of feature vectors.

10. A non-transitory computer readable medium storing a computer program for causing a computer to:
acquire an object image that contains one or more objects;
infer one or more rectangular areas that respectively surround the one or more objects in the object image, and a type of each of the one or more objects, by applying the object image to a first learning model;
acquire an area of a target object in the object image by applying the one or more rectangular areas and the type of each of the one or more rectangular areas to a second learning model;
extract colors of the target object;
generate a plurality of feature vectors for the target object by applying a color feature vector indicating the colors of the target object extracted by the extraction unit, and the object image, to a plurality of learning models; and
search for similar images that are similar to the object image of the target object, using the color feature vector and the plurality of feature vectors.

* * * * *